Dec. 24, 1968 A. L. MIX, JR., ET AL 3,417,850
PNEUMATIC INCREMENTAL TAPE ACTUATOR
Filed Oct. 12, 1965
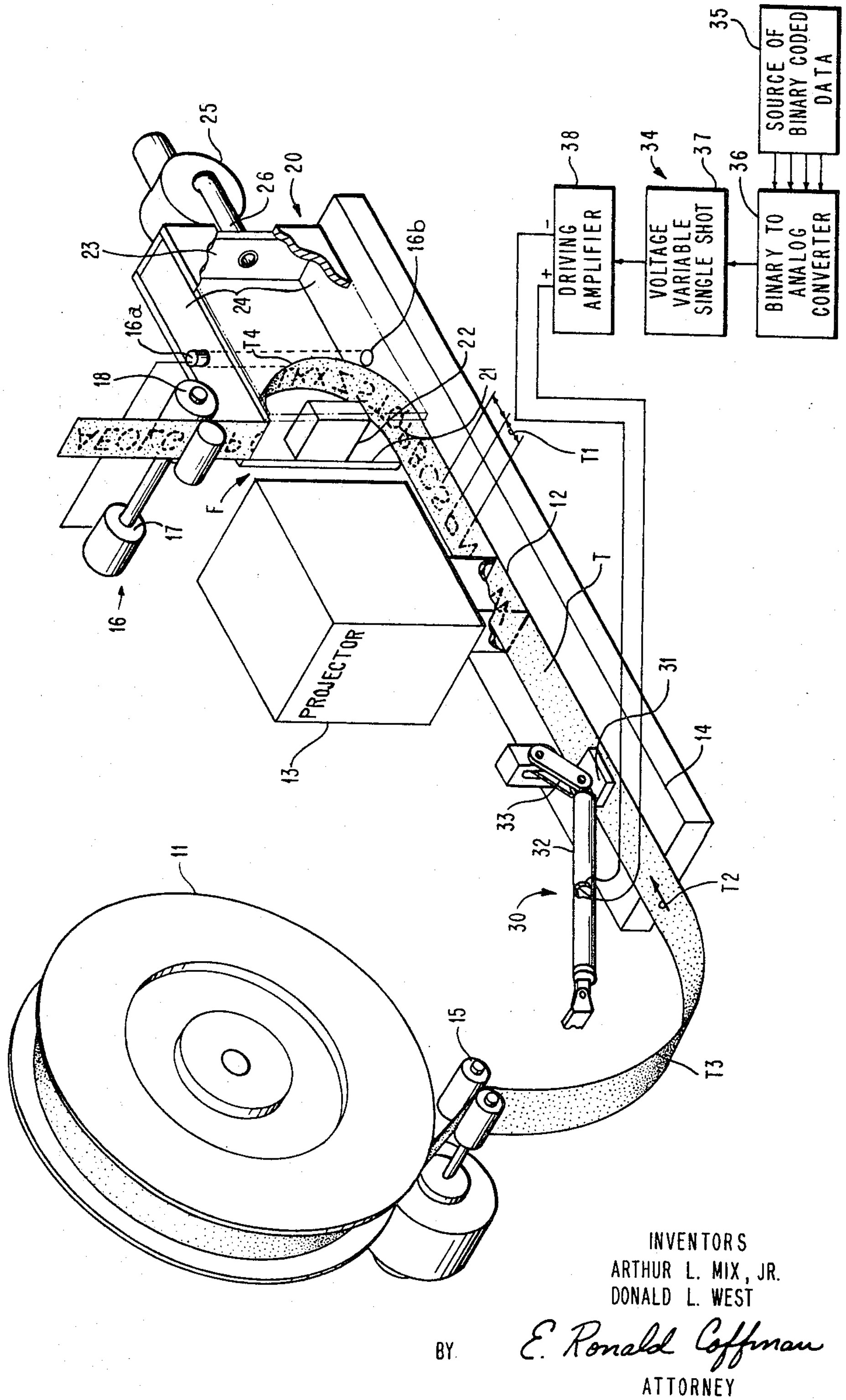
INVENTORS
ARTHUR L. MIX, JR.
DONALD L. WEST
BY E. Ronald Coffman
ATTORNEY United States Patent Office 3,417,850
Patented Dec. 24, 1968

3,417,850

PNEUMATIC INCREMENTAL TAPE ACTUATOR

Arthur L. Mix, Jr., and Donald L. West, Lexington, Ky., assignors to International Business Machines Corporation, Armonk, N.Y., a corporation of New York Filed Oct. 12, 1965, Ser. No. 495,220
1 Claim. (Cl. 197—133)

ABSTRACT OF THE DISCLOSURE

A continuous web is fed incrementally in precise steps past an operating station by the application of a substantially constant pneumatic loading directly on the web, in combination with a brake that initiates and terminates web motion. High speed precision stepping is obtainable due to the absence of any incrementing mechanical feed members moving with the web. The feed increment is readily variable by control of brake timing.

*Disclosure of the invention*

This web feeding apparatus employs a continuous, pneumatically developed pressure force in combination with a precise, fast-acting brake to achieve rapid and easily controllable feed incrementing for purposes of printing, reading, writing, etc.

Sequential operations on a record media ordinarily require incremental movement between the media and an operational station. For example, in a typewriter the paper may be moved in character space increments past a stationary printing station, or vice versa. Magnetic tape having digital entries recorded thereon is commonly stepped in record space increments past a read head for output operation. Incremental spacing is ordinarily achieved by mechanical stepping devices involving pawl and ratchet combinations, stepping motors, etc., all of which are characterized by interent limitations of intertia, mechanical friction, and a severely limited number of available different spacing increments. This latter factor is of significance when considering apparatus such as cold type setting machines requiring proportional spacing between adjacent characters.

Accordingly, it has been an object of this invention to provide record incrementing mechanism having a minimum of parts moving in the direction of feed to minimize inertia problems.

Another object of this invention has been to provide a record incrementing mechanism that is completely electrically controlled to provide maximum flexibility in the incrementing output thereof.

One phase of our invention involves the use of a vacuum chamber which develops a continuous pressure differential across a loop of the record itself to provide a constant actuating force that is resisted by a controllable brake. Sequential release and engagement of the brake determines the feed increments. The feed inertia of the system is minimized to include only the inertia of the record itself, which must be present in any case.

We have determined that an actuating chamber formed by parallel walls spaced apart by approximately the width of the record can provide a substantially constant actuating force by a pressure differential imposed across the record itself. Feed variations are minimized by maintaining the record approximately tangent to structure surrounding its entrance into the chamber to minimize frictional forces. The tangential relationship is a function of the amount of the record in the actuating chamber which is readily controllable by any of several known mechanisms. Preferably, a photoelectrically controlled capstan drive removes a record from the chamber when required to limit the amount of record therein. The capstan serves no actuating function, however, relating to the feed past the operating station.

Another phase of our invention involves the use of an electrically operated brake, preferably a piezoelectric crystal, whereby fast precise braking action can be achieved by development of precise electrical control signals. With an electrically controlled brake, complex functions such as variable spacing are readily achieved by electronic logic having an output that simply varies the brake release time to produce the desired spacing increment.

These and other objects, features and advantages of our invention will be more apparent to those skilled in the art from the following specific description of a preferred embodiment of our invention wherein reference is made to the accompanying drawing of which:

The figure is a perspective view of a record feed apparatus constructed in accordance with our invention as applied to a photocomposing application.

More specifically, there is shown a record feed apparatus F for a flexible strip, continuous web, or tape T supplied from a reel 11 and carried in incremental steps T1 in the direction of arrow T2 past an operating station 12 provided by a printing device or projector 13. The tape T is supported by a table or platform 14, at least at the ends of its path. Incremental actuation of the tape T is obtained by a continuous force applied thereon by actuating chamber 20, and a periodically actuatable feed increment control means 30 that operates a brake shoe 31 to selectively permit or prevent the tape T from moving under the influence of chamber 20.

A supply capstan drive 15 is provided for pulling tape off of reel 11 and operates at a predetermined constant speed equal to the average speed of the tape T to maintain a free loop T3 so as to reduce inherent drag to a constant minimum.

The chamber 20 is formed by a pair of opposed, accurately parallel side walls 21 that are spaced just slightly further than the width of the tape T and are supported in their parallel configuration and partially enclosed by a block 22, end wall 23, and opposed preferably parallel top and bottom walls 24. A continuous pressure differential is created across a loop T4 of the tape by a vacuum pump 25 that is connected to one side of the chamber 20 by a conduit 26. The loop T4 is maintained constant, within a range, by loop limit control means 16. At the point of entry into the chamber 20, the walls 23 and 24 are constructed not to interfere with the natural formation of the loop T4 into a circular arc to maintain a constant effective drive force. Otherwise, the profile of the chamber 20 can be selected as convenient. The extent of loop T4 within chamber 20 is detected by a photoelectric transducer 16a that controls the drive mechanism 17 for a capstan 18 to provide a tape withdrawing means. A light source 16b normally activates transducer 16a, but such activation is interrupted by loop T4 when it exceeds the predetermined limit of its extent into the chamber 20.

As mentioned above, incremental stepping of the tape T is accomplished by operation of brake shoe 31 of feed increment control means 30. Preferably, brake shoe 31 is operated by an electrical-input, mechanical-output transducer 32 that is preferably a length-expander-mode piezoelectric crystal of tubular configuration, connected as part of a conventional toggle linkage 33 to generate the required force-distance operation to actuate and deactuate the brake shoe 31. By way of an example, a linkage having a 10″ ceramic piezoelectric device of one square inch cross-sectioned area could generate a braking force of 2 lbs. with a displacement of approximately 1.4 milliinches. Obviously, these dimensions are illustrative only and a specific element and linkage design is required depending upon the characteristics and geometry of the tape and actuating forces encountered. Lead-zirconate-titanate is an appropriate known example of a piezoelectric ceramic.

Suitable timing control mechanism 34 is provided for electrically energizing transducer 32. The mechanism can be as simple as a clock operated switch for uniform spacing, or as sophisticated as a data controlled variable time increment circuit for achieving proportional escapement. Proportional escapement may be desired, for example, in a photocomposing application. The more sophisticated timing control is shown schematically to illustrate the full breadth of this invention. The timing control mechanism 34 employs a source of binary coded feed or time control data 35 having parallel binary input to a convertor 36. The convertor 36 produces a voltage having a magnitude representative of the desired feed increment, and this voltage is employed as the input to a voltage variable single shot multivibrator 37 of known construction. Circuit 37 generates a fixed voltage when activated, for a period of time that varies according to the input voltage thereto. A more complete description of an appropriate binary-to-analog convertor operating a voltage variable single shot multivibrator to drive an output amplifier may be found in U.S. Patent 2,963,139, entitled "Linespacing Control for Record Feeding Devices," issued Dec. 6, 1960, to P. Andreesen and A. J. Folmar. The single shot output 37 is thus employed to control the transducer 32 through suitable driving amplifier circuitry 38.

The operation of the mechanism is readily apparent from the foregoing description and can be summarized as follows: the tape T is positioned as shown on table 14 and within chamber 20. A continuous force in the direction of arrow T2 is created by vacuum pump 25. The tape does not move, however, due to the normal engagement of brake 31 therewith. When it is desired to create a stepping increment of the tape T, control means 34 is operated causing contraction of transducer 32 and release of brake 31. The force produced in chamber 20 thus pulls the tape to the right until the tape is again arrested by extension of the transducer 32 and engagement by the brake shoe 31. The longer that brake shoe 31 is held out of engagement with the tape T, the longer will be the stepping increment T1.

It will be appreciated by those skilled in the art that we have provided a simple and nearly inertia-free web incrementing mechanism that is particularly suited for use in combination with fast acting electromechanical braking elements as may be provided by a piezoelectric device to permit versatile control through electronic circuitry.

We claim:

1. Apparatus for feeding a strip of flexible material past an operating station in precise incremental steps comprising:

means for supporting the strip for movement past the station, an actuating chamber positioned behind the station and having opposed sidewalls for receiving a loop of the strip therebetween and edge walls at least partially enclosing said chamber, said loop entering said chamber substantially tangent the adjacent edge wall thereof, means establishing a continuous pressure differential across said loop of the strip, means for withdrawing a portion of said loop of the strip from said chamber, and comprising a photoelectric transducer for sensing the extent of said loop between said sidewalls and operating to maintain said loop in a substantially semi-circular arc of constant extent with limited range, a brake comprising a brake shoe positioned adjacent the strip, a toggle linkage supporting said shoe for movement into and away from braking engagement with the strip, said toggle linkage including an electrically controllable, variable length component for selectively effecting said movement, said brake means selectively releasing the strip for movement past the said station under the influence of said pressure differential, or arresting and resisting movement of the strip against the influence of said pressure differential, and timing control means comprising a voltage variable, single shot multiple vibrator circuit, and data input means operatively connected to said circuit for generating a variable voltage indicative of a desired feed increment, said timing control means being operatively connected to said brake for causing alternate releasing, and arresting and resisting operation by said brake for controlled time periods.

References Cited

UNITED STATES PATENTS

| | | | |
|---|---|---|---|
| 1,278,472 | 9/1918 | Ireland | 197—133 |
| 2,560,918 | 7/1951 | Bedford et al. | 226—95 |
| 2,835,761 | 5/1958 | Crownover. | |
| 2,892,379 | 6/1959 | Cooper | 352—166 |
| 2,963,139 | 12/1960 | Andreessen et al. | 197—133 |
| 3,117,256 | 1/1964 | Gamblin. | |
| 3,122,039 | 2/1964 | Sowers | 197—15 X |
| 3,148,816 | 9/1964 | Martin et al. | 226—95 |
| 3,259,288 | 5/1966 | Wassermann. | |
| 3,316,836 | 5/1967 | Epstein. | |

FOREIGN PATENTS

| | | |
|---|---|---|
| 957,919 | 5/1964 | Great Britain. |

ROBERT E. PULFREY, *Primary Examiner.*

E. T. WRIGHT, *Assistant Examiner.*

U.S. Cl. X.R.

197—15; 226—95; 352—166